United States Patent [19]

Patton

[11] 4,105,616

[45] Aug. 8, 1978

[54] HETEROCYCLIC POLYMER SOLUTIONS AND PRODUCTS THEREFROM

[75] Inventor: Tad L. Patton, Baytown, Tex.

[73] Assignee: Exxon Research & Engineering Co., Linden, N.J.

[21] Appl. No.: 845,566

[22] Filed: Oct. 26, 1977

[51] Int. Cl.$^2$ ............................................. C08K 5/15
[52] U.S. Cl. ..................................... 521/62; 156/331; 260/2.5 M; 264/232; 260/30.4 N; 521/157
[58] Field of Search ...... 260/30.4 N, 830 P, 77.5 CH, 260/2.5 R, 2.5 M

[56] References Cited

U.S. PATENT DOCUMENTS

| | | | |
|---|---|---|---|
| 3,609,113 | 9/1971 | Schade | 260/77.5 CH |
| 3,661,859 | 5/1972 | Patton | 260/77.5 CH |
| 3,732,185 | 5/1973 | Hocker | 260/77.5 CH |
| 3,933,758 | 1/1976 | Patton | 260/77.5 CH |
| 3,969,290 | 7/1976 | Kraft | 260/77.5 CH |
| 4,045,337 | 8/1977 | Knickel | 260/77.5 CH |

*Primary Examiner*—Paul R. Michl
*Attorney, Agent, or Firm*—M. B. Kurtzman

[57] ABSTRACT

New solvents have been found for certain poly(parabanic acids) and poly(iminoimidazolidinediones). Epihalohydrins and glycidyl acrylate have been found to be solvents. Cellular films are produced by immersing films of the polymer solutions in aprotic anti-solvents such as aliphatic ketones, esters, hydrocarbons, halogenated hydrocarbons and ethers.

26 Claims, No Drawings

HETEROCYCLIC POLYMER SOLUTIONS AND PRODUCTS THEREFROM

BACKGROUND OF THE INVENTION

The present invention relates to the discovery of new solvents for poly(iminoimidazolidinediones), poly(parabanic acid) resins (PPA) and copolymers of the iminoimidazolidinediones and parabanic acids. More specifically certain poly(parabanic acids) and their precursors, poly(iminoimidazolidinediones) and copolymers of the precursors and poly(parabanic acid) are soluble in epichlorohydrin, the bromo and iodo analogues thereof and glycidyl acrylate.

In the prior art the solvents employed for poly (parabanic acids) have been dipolar aprotic organic materials such as dimethylformamide, diethylformamide, N,N-dimethylacetamide, N,N-diethylacetamide, N,N-dimethylpropionamide, N,N-dimethylbutyramide, N-methylpyrrolidone, N-ethylpyrrolidone, hexamethylphosphoramide, dimethylsulfoxide and the like.

Dimethylformamide and other oganic amide solvents normally contain amine impurities or degradation products such as from the hydrolysis of the amides by water present as an impurity. Even careful and rigorous purification of the amides prior to use and the use of extreme precautions to maintain them in an anhydrous state are rarely successful to prevent the absorption of atmospheric moisture.

The presence of residual or in situ generated amine impurities have been found to be detrimental to poly(parabanic acids) in solution and after casting therefrom. The detrimental effect of the base amine impurities is manifested by molecular weight degradation of the polymer.

Among the advantages obtained by the present invention are (1) complete removal of the solvents from the polymer occurs at lower temperatures and/or at higher rates, (2) the solvents are easily recovered and purified, (3) there are no basic contaminates such as amine impurities, which can attack the poly(parabanic acids) and (4) the solvents are insoluble in water so that water absorption is not a problem as it is with dimethylformamide and the other dipolar aprotic solvents. Furthermore, the present solvents have the advantage that they are superior in applications, such as casting film, coating surfaces and wires, forming laminates, in adhesive formulations, fiber spinning, spray drying and the like, where solvent evaporation is necessary. These and other advantages and features of the present invention will be seen in the following descriptions.

SUMMARY OF THE INVENTION

Briefly stated, the present invention comprises solutions of polymers having the repeating unit

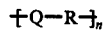

wherein Q is

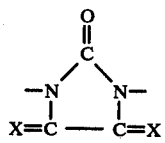

wherein X is 0 or NH, provided that at least one X is 0, R is selected from the group consisting of

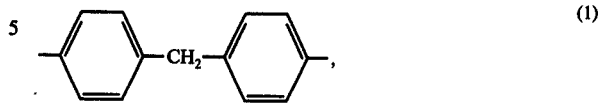

(1)

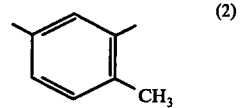

(2)

(3) mixtures of (1) and (2), and (4) 50 to 70 mole percent

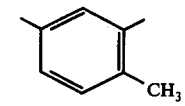

and 30 to 50 mole percent

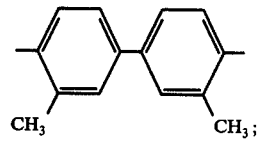

and $n$ is sufficiently large to produce a solid product in a solvent selected from the group consisting of epichlorophydrin, epibromohydrin, epiiodohydrin and glycidyl acrylate. Generally $n$ can be 5 or greater. Preferably the average DP will be 50 to 500 and more preferably 100 to 300.

More specifically, the polymers may be poly (iminoimidazolidinediones), poly(parabanic acids) or copolymers of the iminoimidazolidinediones and parabanic acids of the general structure

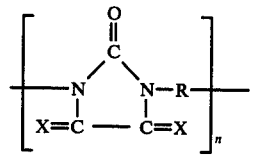

wherein R, X and $n$ have the significance given above and with the provision that at least one X in each unit is 0.

Another aspect of the present invention relates to the method of producing non-cellular films therefrom by casting and evaporation. Because of the high volatility of the solvents, particularly the epihalohydrins, and the high glass transition temperature of the polymers it has been found that bubbles often form in the thick (5 mil) clear film when the solvents are evaporated. It has been found that this may be overcome by adding a small amount, i.e., up to about 25% by weight based on the weight of total solution of polymer and solvent of a prior art dipolar aprotic solvent, such as dimethylformamide, diethylformamide, N,N-dimethylacetamide, N,N-diethylacetamide, N,N-dimethylpropionamide, N,N-dimethylbutyramide, N-methylpyrrolidone, N-ethylpyrrolidone, hexamethylphosphoramide and dimethylsulfoxide, which serve to plasticize the polymer and allow all of the primary solvent to escape rapidly at a relatively low temperature without bubble formation.

Another aspect of the present invention relates to the preparation of cellular films by contacting antisolvents with films of solutions of the specified polymers in epichlorohydrin, epibromohydrin, epiiodohydrin or glycidyl acrylate. The size and shape of the cells in the present process vary widely.

Factors such as concentration of the polymer solution, aging of the polymer solution, concentration of solvent in the film when it contacts the antisolvent, length of time between film formation and its contact with the antisolvent, the specific antisolvent, the temperature of the film at the time of contact with the antisolvent, the length of time in contact with the antisolvent, and the film drying temperature after contact with the antisolvent may all influence cell structure. The poly(imioimidazolidinediones) and poly (parabanic acids) are resistant to most classes of solvents and are insoluble in aliphatic ketones, esters, hydrocarbons, halogenated hydrocarbons and ethers which may all serve as the antisolvent.

Another aspect of the invention is the use of the epihalohydrin solutions of poly(iminoimidazolidinediones) and poly(parabanic acids) as sealants to weld pieces of the polymer articles, such as film and fibers together. The welds made with these solutions on cellular films are particularly desirable since the rapid volatization of the solvent does not tend to destroy the cell structure and weld is substantially invisible. The welds for either solid or cellular films have been observed to be of substantially the same strength as the original films. The welds are easily made by applying the polymer solution to the edges of the film to be joined and abutting the two edges. It is not necessary to overlap the film to make a strong weld or splice. A thin, narrow layer of the polymer solution may then be applied over both sides of the film over the weld.

DETAILED DESCRIPTION OF THE INVENTION

Both the poly(iminoimidazolidinediones) and poly (parabanic acids) and their methods of preparation are known and described in detail in my commonly assigned U.S. Pat. No. 3,661,859 which is incorporated in its entirety herein. The poly(parabanic acids) may also be those produced by other processes, such as shown in U.S. Pat. No. 3,609,113.

Briefly, the poly(iminoimidazolidinediones) may be formed by the reaction of hydrogen cyanide with a diisocyanate or mixture of diisocyanates, the reaction of a dicyanoformamide or mixture of dicyanoformamides with a diisocyanate or a mixture of diisocyanates, or the polymerization of a cyanoformamidyl isocyanate and contain 1,3-imidazolidinedione-1,3-diyl rings of the following structure in the repeat units:

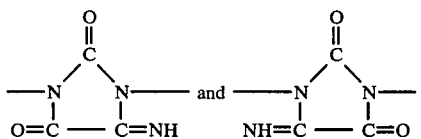

wherein the NH can be in the 4 or 5 position.

The poly(parabanic acids) also designated as poly (1,3-imidazolidinedione-2,4,5-triones) may be prepared for example, by the acid hydrolysis of poly(iminoimidazolidinediones) or by the procedure in 3,609,113 and independent of the particular method of preparing the precursor polymer, all contain the imidazolidinetrione ring in the repeat units:

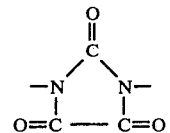

Briefly, the hydrolysis reaction may be carried out by contacting the precursor heterocyclic polymer characterized by the imino-1,3-imidazolidinedione rings with aqueous solutions of Bronsted acids such as hydrochloric, hydrobromic, sulfuric, formic or the like, or with anhydrous hydrogen chloride or hydrogen bromide such that when the polymer is contacted with water or precipitated in water, hydrolysis of the imino groups will occur to produce the polymer characterized by 1,3-imidazolidine,2,4,5-trione-1,3-diyl rings.

Hydrolysis occurs rapidly and may be completed within a few minutes at room temerature. Complete hydrolysis requires a molar quantity of acid equivalent to the molar quantity of imino groups to be hydrolyzed. The general temperature conditions for hydrolysis are between 10° and 120° C. The hydrolysis conditions may be maintained for a few minutes to several hours. The degree of hydrolysis can be controlled by the mole ratio of acid to polymer. Therefore, the degree of hydrolysis can be controlled so as to obtain partial hydrolysis as well as complete hydrolysis. This embodiment of polymers containing both hydrolyzed and unhydrolyzed groups as described is contemplated as a part of the present invention and claimed.

The selectivity of the specified solvents, i.e., epichlorohydrin, epibromohydrin, epiiodohydrin, and glycidyl acrylate, as in regard to the specified polymers is surprising. Quite surprisingly epoxides as a class of compounds are not solvents, e.g., propylene oxide and glycidyl methacrylate are ineffective as solvents for PPA or its precursors.

The epihalohydrins specified are the solvents of choice first because they are more volatile. The solvents have been observed to be stable with various conventional and desirable additives such as flame retardants and stabilizers.

The polymers may be present in the epihalohydrin or glycidyl acrylate in amounts of from 1 to 50, preferably 10 to 25 weight percent based on the total weight of solvent and polymer.

In addition, as noted above, a higher boiling solvent such as dimethylformamide, may be present in an amount of up to 25 weight percent of the total weight of polymer and solvent preferably from about 1 to 10 weight percent on the same basis, to prevent bubble formation in the clear film caused by the rapid evaporation of the epihalohydrin from the film cast from the solution. This improvement is of particular benefit in casting films of over 5 mils thickness.

Coworkers of the present inventor have prepared cellular film from prior art solvents by casting the solution into a thin film, partially evaporating the solvent, coagulating the film in water and drying the film in two stages. However, water was inoperative with film cast from solutions of the polymers in the solvents defined and claimed herein for the production of cellular film.

Furthermore, water will react slowly with the present solvents to produce glycols.

Thus, suitable antisolvents include ketones, esters, hydrocarbons, halogenated hydrocarbons and ethers (preferably aliphatic members of this group). Some specific antisolvents are 1,2-dichloroethane, methylene dichloride, chloroform, carbon tetrachloride, benzene, toluene, xylene, methylacetate, ethyl acetate, n-propylacetate, acetone, butanone-2,4-methyl-2-pentanone, ethyl ether, p-dioxane, heptane and o-dichlorobenzene. The chlorinated hydrocarbons form a preferred class of antisolvents.

Generally, the procedure of preparing cellular film comprises spreading a film of the polymer solution on a suitable substrate such as glass, metal (stainless steel), silicon release paper, polyolefin film and sheets, etc., and contacting said damp film with an antisolvent. It may be desirable to modify the film properties by partially evaporating the solvent from the film prior to contacting it with the antisolvent. At some point in time (1 or 2 minutes with the preferred antisolvents) the film releases from the substrate in the antisolvent. After remaining in the antisolvent for a sufficient time to extract the solvent therefrom, it is removed and dried at 50°–150° C.

It should be noted that the damp film of the solution does not need to come in contact with the antisolvent immediately, hence allowing reasonable latitude in manufacturing procedures.

The term "damp film" as used herein is understood to mean everything from a freshly cast film of polymer solution from which no solvent has been removed to one which is only 20 weight percent solvent.

ILLUSTRATIVE PREFERRED EMBODIMENTS

For purposes of illustration, but not for exclusion, the majority of the examples illustrating the invention will be described in specific with respect to a particular polymer. That is, a polyparabanic acid prepared from diphenyl methane diisocyanate in accordance with proprietary techniques well described in patents assigned to Exxon Research and Engineering Company to result in a high performance polymer having the repeating unit shown below:

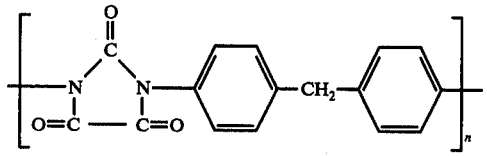

which is also designed as poly[1,4-phenylenemethylene-1,4-phenylene-1,3-(imidazolidine-2,4,5-trione)] which are also designated in chemical abstracts as poly [(2,4,5-trioxo-1,3-imidazolidinediyl)-1,4,-phenylene methylene-1,4-phenylene].

For purposes of convenience, this polymer species will be referred to as PPA-M. It will be recognized that other applicable poly(parabanic acids) can be produced from other precursors.

The PPA polymers have relatively high dielectric strengths, which offer outstanding advantages when used as films in flexible circuitry, for example, air bag circuits, light monitoring circuits, telephone circuits, quartz crystal, oscillator circuits and the like.

They are also especially suitable magnetic tapes (where good dimensional stability at high temperatures is required), for fibers, such as tire cord fibers, where tensile strength and modulus are required, for moldings for electrical connectors and bearings where high temperatures are required, magnetic wire insulation, coatings for cables, cookware, glass fabrics, industrial belts and the like.

In general the preferred polymers of the invention are those which have sufficient repeating units at room temperature to be solids.

In addition to the stabilizers of the present invention it is contemplated that other additives such as those employed to stabilize against oxidation or ultraviolet light, plasticizers, flame retardants, pigments, fillers and the like may be present.

The cellular films are prepared by spreading a film of the polymer solution onto a substrate, partially drying the film if desired generally at temperatures in the range of 25° to 90° C, immersing the damp film in the antisolvent for a sufficient time to remove the solvent then removing the film and drying it generally at 75° to 265° C. It has been found that films of very low density may be produced in this fashion. It was found that the mechanical properties of the film were not sufficiently diminished to seriously affect the utility of the cellular article for many applications. An important and highly advantageous property of the cellular article, as compared to the denser film is that copper circuits may be electroplated directly on to the cellular article (film) with much higher peel strengths.

The cellular film may also be bonded to a substrate by applying the solvent-polymer solution thereto, such as by dipping, brushing, spraying, etc. followed by the treatment as described with the antisolvent.

Generally cellular films of 2 to 20 mils thickness may be produced by the techniques of this invention.

EXAMPLES

The following examples illustrate the present invention and should not be construed to limit the present invention.

EXAMPLE 1

A clear solution of 10 g. of PPA-M in 44 g. of epichlorohydrin was prepared and cast into a film. After evaporation of the solvent a clear tough film remained. The film has an infrared spectrum identical to that of a film of the original polymer which had been cast from dimethylformamide. The spectrum exhibited a strong absorption peak at 5.74 $\mu$ which is characteristic of the parabanic acid ring structure.

EXAMPLE 2

This example compares various epoxides as solvents for PPA-M. One gram of the polymer which had an inherent viscosity of 1 was mixed with 20 ml portions of each of the following epoxides: propylene oxide, glycidyl acrylate, glycidyl methacrylate, epibromohydrin, epichlorohydrin, and 1,2-epoxybutane.

The polymer dissolved readily in epichlorohydrin, epibromohydrin, and glycidyl acrylate. The polymer was insoluble in propylene oxide, glycidyl methacrylate, and 1,2-epoxybutane even after stirring for several hours.

This example demonstrates that PPA-M does not dissolve in all members of the general class of compounds called epoxides.

EXAMPLE 3

This example demonstrates the effectiveness of the presence of a small quantity of dimethylformamide in epichlorohydrin solutions of PPA-M to act as a plasticizer during film formation so that bubbles do not form in the film during the evaporation of the solvent.

A solution of 10 g. of PPA-M in a mixture of 55 g. of epichlorohydrin and 10 g. of dimethylformamide was cast into a 20 mil thick film. The solvent was evaporated at 90° C during a 10 minute period. The self supporting film was then dried over night at 150° C in a vacuum oven to remove all of the solvents. The clear film was bubble free.

EXAMPLE 4

These results show that the mechanical properties of films of PPA-M which were cast from epichlorohydrin, and DMF (dimethylformamide), were essentially the same.

The following solutions were prepared by dissolving 10 g. of PPA-M in the solvents indicated in TABLE I.

TABLE I

| Solution | Solvents |
| --- | --- |
| A | 50 g. epichlorophdrin |
| B | 50 g. epichlorohydrin + 0.001 g. DMF |
| C | 50 g. epichlorohydrin + 0.010 g. DMF |
| D | 50 g. DMF |

After drying 20 hours at 120° C the clear films had the following properties in TABLE II.

TABLE II

| Film | Thickness (mil) | $TB^a$, psi | Tear Strength, g/mil |
| --- | --- | --- | --- |
| A | 3.6 | 14,700 | 17.1 |
| B | 2.8 | 16,900 | 16.7 |
| C | 3.9 | 15,150 | 17.5 |
| D | 3.0 | 16,100 | 14.3 |

$^a$TB = tensile strength at break

EXAMPLE 5

This example demonstrates that a film of PPA-M which contains a flame retardant and an inorganic additive such as copper 8-hydroxyquinolinolate can be cast from epichlorohydrin and that its properties are comparable to those of a similarly cast film which does not contain any additives.

(A) A film (2 mils thick) was cast from a solution which contained 18 g. of PPA-M ($\eta$inh = 1.0), 1.08 g. of octabromobiphenyl, and 0.054 g. of copper 8-hydroxyquinolinolate in 146 g. of epichlorohydrin.

(B) A film (2 mil) was also cast from a solution which contained 18 g. of the same polymer in 146 g. of epichlorohydrin. No additives were present.

Both films were cast on glass plates and most of the solvent was evaporated at 70° C. The films were then mounted on frames and dried for 60 hours at 165° C. A comparison of their mechanical properties show that the two films were comparable to each other (TABLE III).

TABLE III

| Film | $TB^a$, psi | Tear strength, g/mil |
| --- | --- | --- |
| A | 15,000 | 12.9 |
| B | 15,500 | 10.5 |

$^a$TB = Tensile strength at break.

EXAMPLE 6

This example demonstrates that epichlorohydrin solutions of PPA-M can be used to weld (or splice) films of the same polymer together.

Strips of 5 mil thick film of PPA-M were cut into two pieces each. Then they were spliced together by coating the thin (5 mil thick) edges with a 10 weight percent solution of PPA-M in epichlorohydrin. The edges were then butted together (not overlapped). Then a quarter inch wide thin (0.5–1 mil) film of the polymer solution was coated over the seam on both sides. After drying at room temperature for 5 minutes and then at 150° C for an additional 10 minutes, the splicing was completed. The strength of two splices revealed that they were as strong as the film itself. Five sections of each splice were tested. The average of the results are recorded below in TABLE IV.

TABLE IV

| Weld No. | $TB^a$, psi | Comments |
| --- | --- | --- |
| 1 | 14,200 | 4 out of 5 films broke at points other than at the splice |
| 2 | 13,000 | 3 out of 5 films broke at points other than at the splice |
| Film (no weld) | 14,400 | |

$^a$TB = tensile strength at break.

EXAMPLE 7

The results recorded below demonstrate that a wide variety of organic solvents which are antisolvents for PPA-M can be used to prepare low density cellular films from epichlorohydrin solutions of the polymers.

Two epichlorohydrin solutions of PPA-M were used in these experiments; one solution contained 10 wt.% of the polymer and the other contained 18 wt.% of the polymer films (20 mils thick) were cast onto glass plates. Then the plate and wet film were immersed immediately in one of the solvents listed below. The elapsed time before the film released from the glass was noted in TABLE V. At this time the cellular film had formed. Immersion was continued in some cases to permit further extraction of the epichlorohydrin from the film. The films were then dried at 90° C.

TABLE V

| Solvent | Release time, minutes from 10% solu. | from 18% solu. |
| --- | --- | --- |
| 1,2-dichloroethane | 2 | 2 |
| methylenedichloride | 2 | 2 |
| chloroform | 2 | 2 |
| carbon tetrachloride | 5 | — |
| benzene | 11 | 8 |
| toluene | 5 | 6 |
| xylene | 9 | 9 |
| methyl acetate | 6 | 8 |
| ethyl acetate | 30 | — |
| n-propylacetate | 240 | — |
| amyl acetate | 149 | — |
| acetone | 171 | — |
| butanone-2 | 16 | — |
| 4-methyl-2-pentanone | 5 | 7 |
| ethyl ether | 12 | — |
| p-dioxane | 70 | — |
| heptane | 4 | 8 |

TABLE V-continued

| Solvent | Release time, minutes | |
|---|---|---|
| | from 10% solu. | from 18% solu. |
| o-dichlorobenzene | 12 | 17 |

Generally, the films cast from the 18% solution required more contact time with the anti-solvent before they released from from the glass than did those films which were cast from the 10% solution.

The chlorinated hydrocarbons were the most efficient anti-solvents although all of them worked with various degrees of success.

EXAMPLE 8

This is a process for making cellular film from an epichlorohydrin solution of PPA-M and chloroform.

A 12% solution of PPA-M in epichlorohydrin was spread into a clear thin film on a glass plate. It was immersed immediately in chloroform. After 5 minutes the white opaque film was transferred to a frame and dried in an oven at 110°. The film was opaque white and both surfaces were smooth. A photomicrograph of a cross section of the film showed that the interior of the film was cellular.

EXAMPLE 9

This is a process for making cellular film from an epichlorohydrin solution of PPA-M and chloroform. It differs from that in Example 8 in that two separate chloroform baths are used. In the first bath the film coagulates and the film releases from its substrate. In the second bath most of the remaining epichlorohydrin is extracted from the film.

A clear thin film of a 12% solution of PPA-M was spread on a glass plate. It was immersed immediately in chloroform. After soaking 2 minutes, the film released from its substrate and was transferred to a bath of fresh chloroform. After soaking an additional 2 minutes the film was framed and dried. Examination of a cross section of the opaque film revealed that both surfaces were continuous and the interior was cellular.

EXAMPLE 10

This example compares two cellular films which were made from eipchlorohydrin solutions of PPA-M and chloroform. One of the solutions contained a flame retardant. Both films were cast on stainless steel plates instead of glass.

Solution A was prepared by dissolving 12.5g of PPA-M and 1.0g of octabromobiphenyl in 65g of epichlorohydrin.

Solution B was prepared by dissolving 12g of PPA-M in 60g of epichlorohydrin.

Films of each solution were cast on polished stainless steel plates using a doctor's knife. The plates with the solution films were immediately immersed in chloroform. After 2 minutes, the films released from their substrates and were soaked an additional 3 minutes in chloroform. The films (8½ inches × 14½ inches) were clamped to frames and dried at 90° C for 10 minutes. Although the films appeared dry they were put in a 250° C oven for 1 minute to completely expel all solvents. Both surfaces of the films were smooth, but electronmicrographs of their cross sections revealed that the interiors were cellular. The presence of cells is responsible for the low densities (see below); in comparison clear void-free films cast from DMF or epichlorohydrin as described in example 5 have a density of 1.30. The properties of the films made in this example appear below in TABLE VI.

TABLE VI

| | From Solu. A | From Solu. B |
|---|---|---|
| Thickness: | 6 mil | 6 mil |
| Density, g/cc | 0.40 | 0.346 |
| Flammability | non-burning | burns |
| Tensile str. psi | 3407 | 1920 |
| Elongation to Break, % | 32.8% | 15.4% |
| Tear Strength, g/mil | 4.75 | 5.61 |

EXAMPLE 11

This example demonstrates the formation of PPA-M cellular film using polypropylene as a substrate.

A film of solution B prepared for Example 10 was cast onto a thick sheet (⅛ inch thick) of polypropylene. It was then immersed in chloroform. It separated from the substrate after about one minute. After soaking in chloroform an additional 4 minutes, the film was removed and dried. It was a low density opaque film like that in example 8.

EXAMPLE 12

Example 11 was repeated using a commercial release type paper for the substrate. The film was comparable to that made in Example 8.

EXAMPLE 13

This Example demonstrates that immediate immersion in antisolvent of the wet film of an epichlorohydrin solution of PPA-M is not necessary for the formation of cellular film.

A solution was prepared by dissolving 15g of PPA-M ($\eta$inh=0.80) in 85g of epichlorohydrin. It was then cast onto a film on a glass plate. The wet film was exposed to the air at room temperature for 4 minutes during which time some of the solvent evaporated. Then the wet film was immersed in chloroform. It was removed after 12 minutes and dried at 110° C. The dry film had an inherent viscosity of 0.80 which was the same as that of the PPA-M from which it was made. Therefore, no polymer degradation occurred during the solution preparation, film formation and drying. The cellular film had a density of 0.386 g/cc; it was 8.0 mils thick.

EXAMPLE 14

The same procedure as example 13 was used, except the inherent viscosity of the PPA-M used was 1.48 and the concentration of PPA-M in the epichlorohydrin solution of the polymer was 10%.

The film was cast and dried exactly as was that in example 13. The inherent viscosity of the polymer in the film was 1.48 which was the same as that of the polymer from which it was made. The film had a density of only 0.231 g/cc and was 7.2 mils thick. The lower density (compared to that in example 13) probably resulted from the polymer solution being more dilute than that in the previous example 14.

EXAMPLE 15

This example is concerned with the solubility of various parabanic acid polymers in epichlorohydrin. The general poly(parabanic acid) structure is:

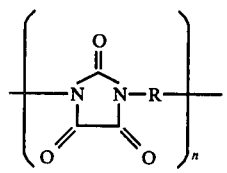

where R =

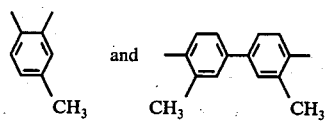, a mixture of and a mixture of where n = 5 or greater with the average DP being 75 to 150 (sufficient to produce a solid).

The solubility of the various PPA resins were tested by mixing 1 g portions of the polymers with 20 g of epichlorohydrin and 20 g of DMF. All of the polymers were completely soluble in DMF. The solubility of each polymer in epichlorohydrin was observed and is recorded below. It will be noted that solubility in epichlorohydrin is not a general property of all poly(parabanic acids) but is sensitive to the structure of the R group in the repeat unit.

| R | Solubility in epichlorohydrin |
|---|---|
| —⌬—CH₂—⌬— | soluble |
| —⌬—O—⌬— | insoluble |
| (tolyl-CH₃) | soluble |
| (dimethylbiphenyl) | insoluble |
| (20%) tolyl + (80%) —⌬—CH₂—⌬— | soluble |
| (50%) tolyl + (50%) —⌬—CH₂—⌬— | soluble |
| (40%) —⌬—CH₂—⌬— + (60%) dimethylbiphenyl | insoluble |
| (60%) tolyl + (40%) dimethylbiphenyl | soluble |
| (80%) tolyl + (20%) dimethylbiphenyl | insoluble |

EXAMPLE 16

This example further demonstrates the splicing of films using solutions according to the present invention compared with DMF solutions of polymer. The solutions used contained 15 grams of PPA-M in 85 grams of solvent. The films used were a clear PPA-M film and a cellular PPA-M film.

Each film was cut into strips, the strips cut and rejoined by applying the polymer solution along the thin edge of each film. The edges are then abutted. Then a quarter inch wide thin (0.5–1 mil) film of the polymer solution coated over the weld on both sides. The welded samples were then tested as follows:

| | Clear Film (5 mil) | | |
|---|---|---|---|
| | Drying Conditions | | Tensile Strength |
| Solvent | Temp. C | Time Min. | psi |
| DMF | 95 | 60 | 9,950 |
| Epichlorohydrin | 95 | 60 | 10,200 |
| DMF | 118 | 5 | 5,460 |
| Epichlorohydrin | 118 | 5 | 9,850 |
| | Cellular Film (10 mil) | | |
| | | | Tensile Strength, psi |
| DMF | 118 | 2 | Too soft to pull |
| Epichlorohydrin | 118 | 2 | 1,706 |
| DMF | 124 | 15 | 3,400 |
| Epichlorohydrin | 124 | 15 | 3,100 |

The clear spliced films using either solvents were indistinguishable. The cellular film welds made with the DMF solutions lost their cellular structure in the region of the weld, whereas this did not occur with epichlorohydrin solutions.

Splices made with epichlorohydrin solutions of PPA-M formed a strong bond in a shorter curing time than did splices which were made with the DMF solution.

EXAMPLE 17

In 76 g of epichlorohydrin was dissolved 10 g of a poly(iminoimidazolidinedione) which was made from diphenylmethane diisocyanate. The solution was cast into a thin film and the solvent evaporated. The infrared spectrum of the dry film was identical to that of the original polymer and of a film of the polymer which had been cast from dimethylformamide. The spectrum had absorption peaks at 3.04, 5.55, 5.72 and 6.0 μ which are characteristic of the iminoimidazolidinediones polymers. Polymer Preprints 12, No. 1, p. 163 (1971).

EXAMPLE 18

This example demonstrates the splicing of PPA polymer which is insoluble in the epichlorohydrin. The polymer is that where R is

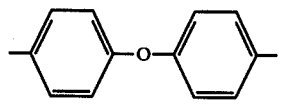

The solution used was 15 g of PPA-M in 85 g of epichlorohydrin. The same procedure as Example 15 was followed. The film was 2 mil thick. Drying time of the weld was about 10 minutes. The weld had the same appearance as those made with the soluble films. The tensile strength of the weld was substantially the same as the film.

Dissimilar films of either the soluble of insoluble type may also be spliced.

What is claimed is:

1. A solution of polymer having the repeating unit:

wherein Q is

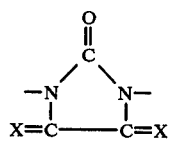

wherein X is O or NH, provided that at least one X is O, R is selected from the group consisting of

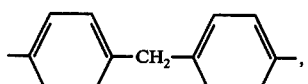 (1)

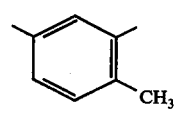 (2)

(3) mixtures of (1) and (2), and (4) 50 to 70 mole percent

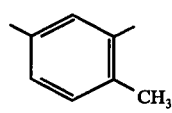

and 30 to 50 mole percent

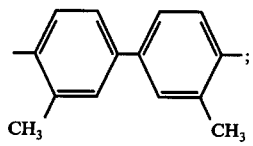

and n is sufficiently large to produce a solid product in a solvent selected from the group consisting of epichlorohydrin, epibromohydrin, and glycidyl acrylate.

2. The polymer solution according to claim 1 wherein said polymer is present in amounts of from 1 to 50 weight percent based on total weight of solvent and polymer.

3. The polymer solution according to claim 2 wherein the said polymer is present in amounts of 10 to 25 weight percent.

4. The polymer solution according to claim 1 wherein the solvent is epichlorohydrin.

5. The polymer solution according to claim 1 wherein the solvent is epibromohydrin.

6. The polymer solution according to claim 1 wherein the solvent is glycidyl acrylate.

7. The polymer solution according to claim 4 wherein Q is

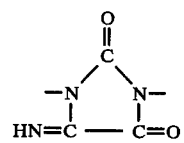

and R is

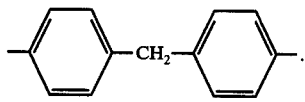

8. The polymer solution according to claim 4 wherein Q is

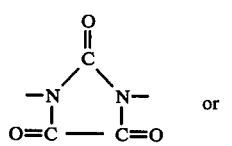 or 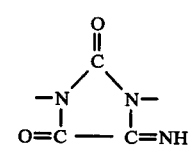

9. The polymer solution according to claim 8 wherein R is

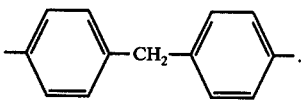

10. The polymer solution according to claim 8 wherein R is

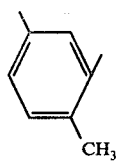

11. The polymer solution according to claim 8 wherein R is a mixture of

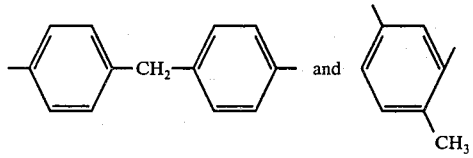

12. The polymer solution according to claim 8 wherein R is 50 to 70 mole percent

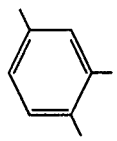

and 30 to 50 mole percent

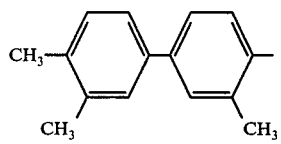

13. The polymer solution according to claim 1 containing up to 25 weight percent of a dipolar aprotic polymer solvent based on the total weight of solvent and polymer.

14. The polymer solution according to claim 13 wherein said dipolar aprotic solvent is dimethylformamide, diethylformamide, N,N-dimethylacetamide, N,N-diethylacetamide, N,N-dimethylpropionamide, N,N-dimethylbutyramide, N-methylpyrrolidone, N-ethylpyrrolidone, hexamethylphosphoramide or dimethylsulfoxide.

15. The polymer solution according to claim 14 wherein 1 to 25 weight percent of said dipolar aprotic polymer solvent is present.

16. The polymer solution according to claim 13 wherein the dipolar aprotic polymer solvent is dimethylformamide.

17. The process of preparing a cellular film comprising spreading a film of a solution of polymers having the repeating unit:

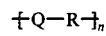

wherein Q is

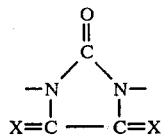

wherein X is 0 or NH, provided that at least one X is 0, R is selected from the group consisting of

 (1)

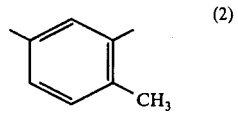 (2)

(3) mixtures of (1) and (2), and (4) 50 to 70 mole percent

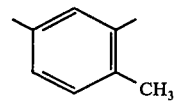

and 30 to 50 mole percent

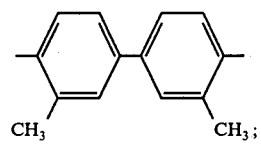

and n is sufficiently large to produce a solid product in a solvent selected from the group consisting of epichlorohydrin, epibromohydrin, and glycidyl acrylate, immersing said film in an aprotic antisolvent, removing said film from said antisolvent and drying said film.

18. The process of claim 17 wherein the antisolvent is ketone, ester, hydrocarbon, halogenated hydrocarbon or ether.

19. The process according to claim 18 wherein the antisolvent is 1,2-dichloroethane, methylene dichloride, chloroform, carbon tetrachloride, benzene, toluene, xylene, methylacetate, ethylacetate, n-propylacetate, acetone, butanone-2, 4-methyl-2 pentanone, ethyl ether, p-dioxane, heptane and dichlorobenzene.

20. The process according to claim 18 wherein said film is partially dried prior to immersing in said antisolvent.

21. A method of joining articles of PPA polymers comprising: applying a solution of polymer having the repeating unit:

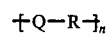

wherein Q is

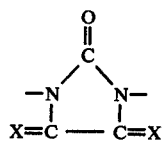

wherein X is O or NH, provided that at least one X is O,

R is selected from the group consisting of

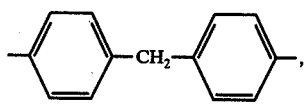 (1)

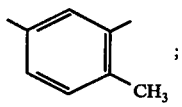 (2)

(3) mixtures of (1) and (2), (4) 50 to 70 mole percent

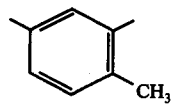

and 30 to 50 mole percent

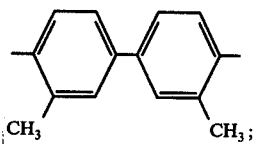

and $n$ is sufficiently large to produce a solid product, in a solvent selected from the group consisting of epichlorohydrin, epibromohydrin, epiiodohydrin and glycidyl acrylate to the surface portions of two articles joined, abutting the two surfaces and volatilizing said solvent.

22. The method according to claim 21 wherein the articles are films.

23. The method according to claim 22 wherein the two films to be joined are the same polymer.

24. The method according to claim 21 wherein the polymer in solution is the same as that to be joined.

25. The method according to claim 22 wherein a film of polymer solution is applied over the abutted edges.

26. The method according to claim 22 wherein the two films to be joined are different polymers.

* * * * *